INVENTOR.
MYRON L. ANTHONY

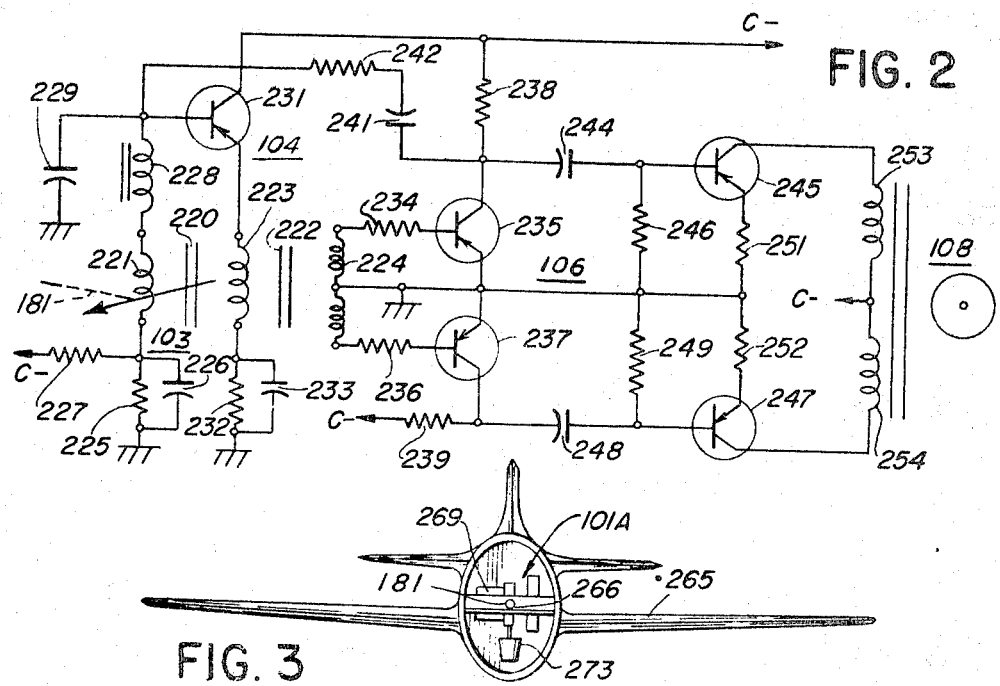
FIG. 2
FIG. 3
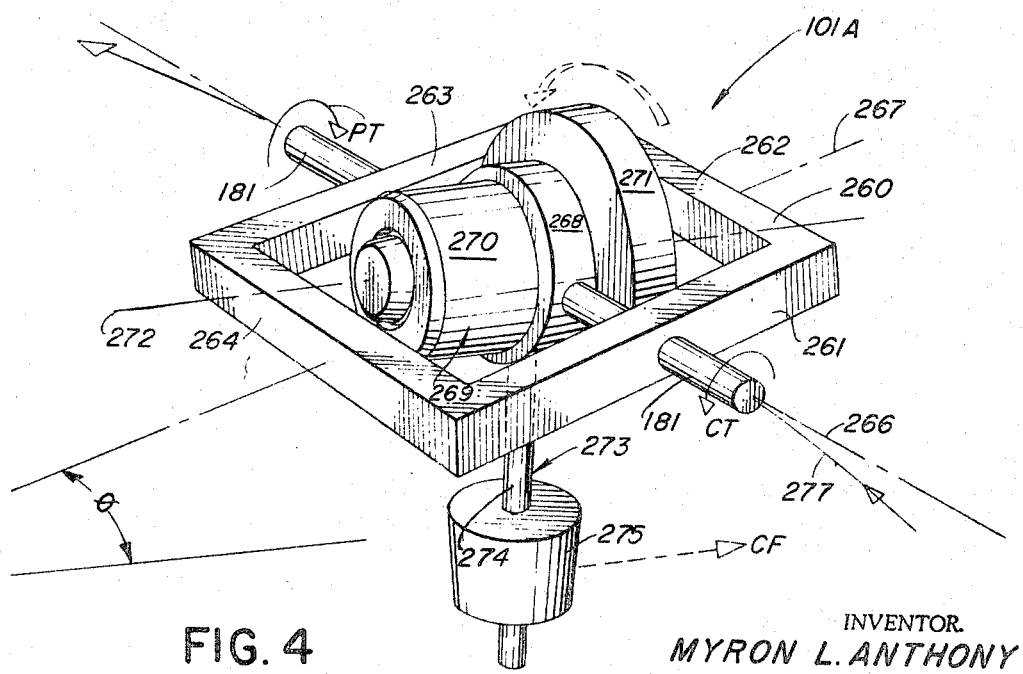
FIG. 4
INVENTOR.
MYRON L. ANTHONY

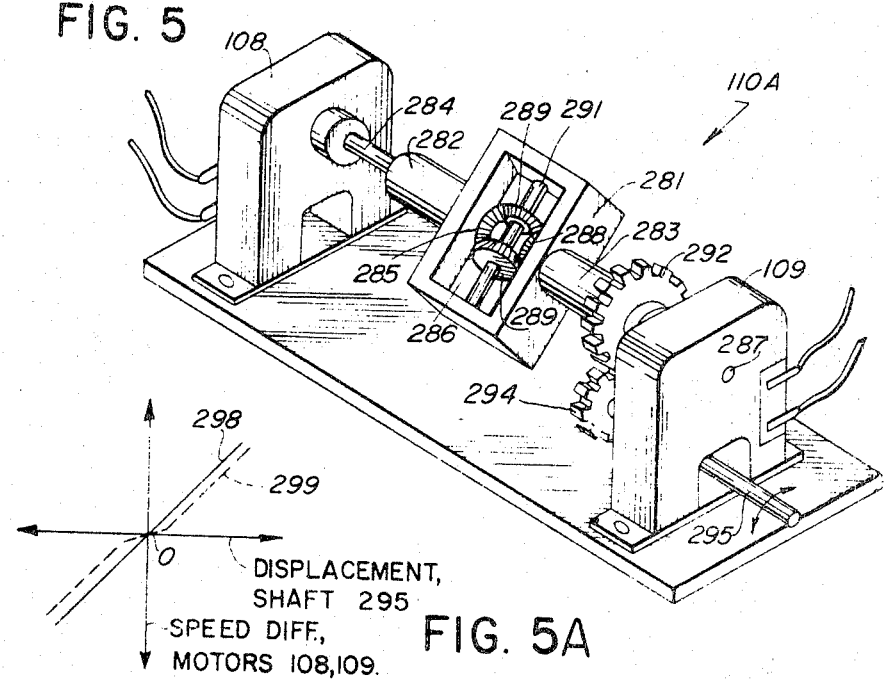
FIG. 5
FIG. 5A
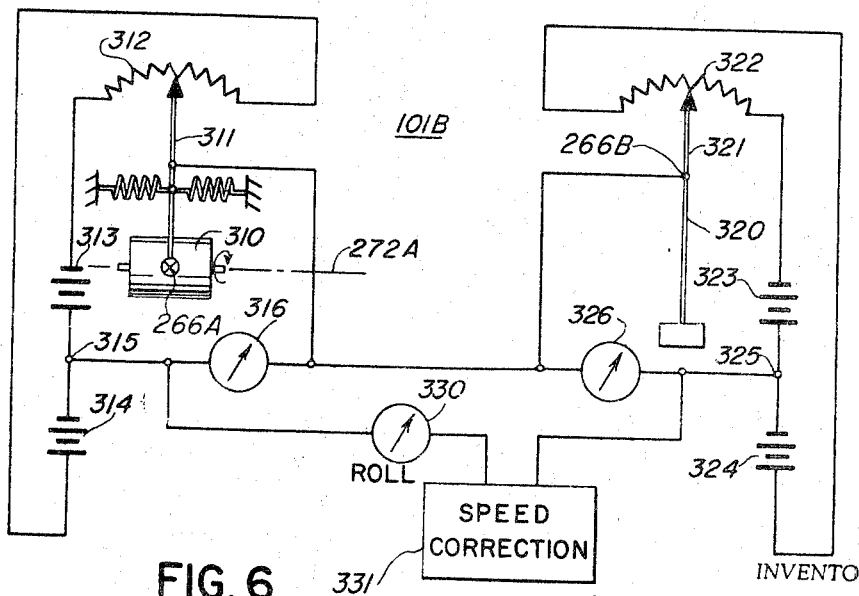
FIG. 6

Jan. 6, 1970    M. L. ANTHONY    3,488,427
CONTROL SYSTEM FOR AIRCRAFT NAVIGATION DISPLAY AND AUTOPILOT
Original Filed April 1, 1964    5 Sheets-Sheet 5

INVENTOR.
MYRON L. ANTHONY
BY
Wallace, Kinger & Horn
ATTYS

United States Patent Office 3,488,427
Patented Jan. 6, 1970

3,488,427
CONTROL SYSTEM FOR AIRCRAFT NAVIGATION DISPLAY AND AUTOPILOT
Myron L. Anthony, La Grange, Ill., assignor of ten percent to Thomas E. Dorn, Clarendon Hills, Ill.
Original application Apr. 1, 1964, Ser. No. 356,462, now Patent No. 3,344,665, dated Oct. 3, 1967. Divided and this application Sept. 11, 1967, Ser. No. 666,763
Int. Cl. G01c *21/20*
U.S. Cl. 73—178       6 Claims

ABSTRACT OF THE DISCLOSURE

A control system for actuating a complete navigational display, including an aircraft attitude and speed display and a position plotter, that is also used to actuate an autopilot. The complete control system includes a roll control apparatus comprising a pendulum-type roll sensing device, a pair of mechanically actuated variable radio transducers driven in push-pull relation by the roll sensing device, and a pair of oscillators coupled to respective ones of the transducers and modulated in frequency in push-pull relation to each other by the transducers. The oscillators energize a pair of synchronous motors connected, respectively, to the two inputs of a differential drive so that the output shaft of the differential drive rotates in response to any speed differential between the motors and the angular displacement of the output shaft continuously represents the roll attitude of the aircraft. The system further includes a turn control apparatus that is essentially similar to the roll control apparatus except that a turn sensing device is used instead of the roll sensing device and the angular displacement of the output shaft of the turn control apparatus continuously represents the heading of the aircraft based on dead reckoning. A settable heading recording device is employed to record a selected flight heading and is connected to an additional differential that has a second input connected to the output shaft of the turn control apparatus, the additional differential developing an output signal representative of differences between the pre-selected flight heading and the actual heading of the aircraft. The output signal from the additional differential is applied to one oscillator in the roll control apparatus to modify the position of the roll control output shaft. An autopilot is connected to that output shaft and actuated in response to changes in roll attitude and in response to differences between actual and pre-selected heading. The system further includes a speed command display control similar to the roll control apparatus described above but having two inputs, one taken from a speed sensing device and the other from a settable means representative of a pre-selected flight speed. The position plotter control utilizes the output of the turn control apparatus described above in conjunction with a pair of ball disc integrators that resolve the heading information from the turn control apparatus into coordinate plotting data to actuate a dead reckoning position plotter, the ball disc integrators being provided with means for setting in wind data.

CROSS REFERENCES TO RELATED APPLICATIONS

This application is a division of application Ser. No. 356,462, filed Apr. 1, 1964, now Patent No. 3,344,665, issued Oct. 3, 1967. Another divisional application of the aforesaid original application is Ser. No. 666,905, filed Sept. 11, 1967; a division and continuation-in-part of the present application was filed as Ser. No. 762,923 under date of Sept. 26, 1968.

BACKGROUND OF THE INVENTION

This invention relates to a new and improved navigation system for aircraft; more particularly, the invention pertains to integration control apparatus and data processing devices utilized to actuate and control a display that presents aircraft performance and position to the pilot for instrument flying purposes.

The provision of adequate and usable equipment for instrument flying of aircraft has come to present a multitude of difficult and potentially dangerous problems. In view of the increasing numbers of private aircraft, it has become virtually essential to afford a relatively inexpensive instrumentation system that will enable a pilot having limited training, who flies on relatively infrequent occasions, to master at least the fundamentals of flying by instruments. This is virtually impossible with conventional aircraft instruments, which have been characterized by one administrator of the Federal Aviation Agency as a "steamfitter's nightmare" added to the cockpit of the aircraft in bits and pieces without sensible planning.

Using conventional instruments, some sixty hours or more of training and an additional forty hours or more of flight instruction are required to enable most pilots to obtain even a limited mastery of instrument flying. This initial instruction must be followed by continuing practice on the part of the pilot. Even with this training, instrument flying with known control and display equipment is quite difficult; pilots with many hours of experience frequently find instrument flying to be an exhausting and frustrating experience. Nevertheless, because weather conditions can change rapidly under many circumstances, instrument flight capability of a rudimentary nature has been made a requisite for obtaining even a private flying license.

In comparing flying by visual reference and instrument flying, it is apparent that the aircraft controls and the pilot remain the same. Consequently, the existing disparity between the relative ease of piloting by visual reference and the difficulty of piloting by instrument must lie in the instruments themselves and in the manner in which they present flight information to the pilot. Generally speaking, conventional instruments present flight data to the pilot in a relatively unnatural manner. The psychological effects produced by many conventional instruments are to a substantial extent analogous to working with a mechanism while viewing the mechanism in a mirror. One example is presented by the differences between flying toward an object through visual reference and flying toward the same object by reference to a compass heading.

Virtually anyone can point an aircraft toward a visible object; by the same token, virtually anyone could equally well direct the aircraft along a given compass heading if the compass presentation were physically similar to the visual presentation. A conventional aircraft compass, however, affords what amounts to an inside-out presentation. Consequently, when the aircraft deviates from the selected heading, even experienced pilots must consciously remember which way to turn the aircraft in order to restore it to the proper heading. The correction of the aircraft heading is not a natural and instantaneous reaction to the error information in the form presented by a conventional compass. Moreover, similar difficulties and disadvantages are presented by other conventional flying instruments, such as the gyroscopic attitude indicator, sometimes referred to as an "artificial horizon."

SUMMARY OF THE INVENTION

It is a principal object of the present invention, therefore, to present to the pilot of an aircraft an instantly understandable display of the flight performance of the aircraft, in a manner which is essentially analogous to the availability of the corresponding information when the pilot is flying on the basis of visual observation.

Another object of the invention is to provide a new and improved display system for instrument flying of aircraft that enables the pilot to pre-set certain performance criteria for a given flight, including particularly air speed and heading criteria, and that presents aircraft performance on the basis of differentials between the pre-set criteria and actual values to enable the pilot to control the aircraft and maintain the flight in accordance with the pre-set criteria.

Another object of the invention is to afford a convenient and effective means for adjusting a navigational position display device of the dead-reckoning type, used for aircraft instrument flying, for wind vector corrections.

In any aircraft instrumentation system, it is virtually always necessary to integrate primary sensed data, with respect to changes in attitude and other performance criteria of the aircraft, in order to present a reasonable display that the pilot may use for flying the aircraft. This is particularly true with respect to position plotting displays, since the aircraft position changes as the time integral of attitude changes on the part of the aircraft. In an aircraft instrumentation system, the integrating apparatus must be capable of working through a zero point, since the aircraft can turn through a full arc of 360° in any direction and can rotate about its own axis through a full circular arc. Most known integrating devices are subject to at least some hysteresis error in the zero region and, consequently, may introduce substantial long-term error in the operation of an aircraft instrument system. By the same token, virtually all known integrating devices are subject to some drift, this being particularly true of all-electronic devices where some temperature changes may occur.

It is an object of the present invention, therefore, to afford a new and improved integrating apparatus for use in an aircraft instrumentation system that effectively minimizes or eliminates errors, and particularly hysteresis errors, in the course of integrating through and around the zero point.

Another object of the invention is to eliminate thermal drift and other long-term errors in the operation of an integration system applied to aircraft instrumentation, and particularly to a direction-indicating and position plotting apparatus.

A specific object of the invention is to provide for virtually error-free integration of flight performance data, in an aircraft, using a simple and inexpensive combination of known devices. In particular, the present invention combines a frequency modulation system with mechanical adding means to afford precision integration, without substantial drift, including integration around the zero point.

A further object of the invention is to provide a new and improved comprehensive aircraft instrumentation system that is relatively inexpensive, as compared with comparably comprehensive systems constructed with conventional apparatus, yet which facilitates rapid learning of instrument flying at minimum expense.

Accordingly, the present invention relates to a control system for aircraft instrumentation, autopilot control, and other applications requiring long-term stability in monitoring a given function. The control system comprises first and second oscillators each having a frequency-determining circuit tuned to a given operating frequency and first and second mechanically-actuated variable ratio transducers each coupled to the frequency determining circuit of a respective one of the oscillators. Actuating means are provided for actuating the transducers in effective push-pull relation in accordance with a given function to be monitored to modulate the operating frequencies of the oscillators in opposite senses in accordance with that function. In some embodiments, separate input devices may be utilized as the actuating means. First and second synchronized stepping motors are coupled to respective ones of the oscillators, each of the motors having a rotational speed directly proportional to the operating frequency of the oscillator to which the motor is connected. The system further includes monitoring means comprising a differential drive, usually a gear differential, having two input shafts and an output shaft, each of the input shafts being driven by a respective one of the synchronous stepping motors. Thus, the output shaft of the differential drive rotates at a speed representative of the speed differential between the motors and in a direction that indicates which motor exceeds the speed of the other.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

BRIEF DESCRIPTION OF THE DRAWINGS

FIG. 2 is a schematic circuit diagram of a control circuit used in the roll attitude indicator portion of the system of FIG. 1;

FIG. 3 illustrates the orientation of a mechanical roll sensing device of the invention within an aircraft;

FIG. 4 is a perspective view of the roll sensing device;

FIG. 5 is a perspective view of a differential adding mechanism used in one embodiment of the control system;

FIG. 5A is an explanatory diagram illustrating operating characteristics of certain integrating apparatus used in the control system;

FIG. 6 is a schematic circuit diagram for an electrically operated roll sensing device;

GENERAL CONTROL SYSTEM

Figure 1:
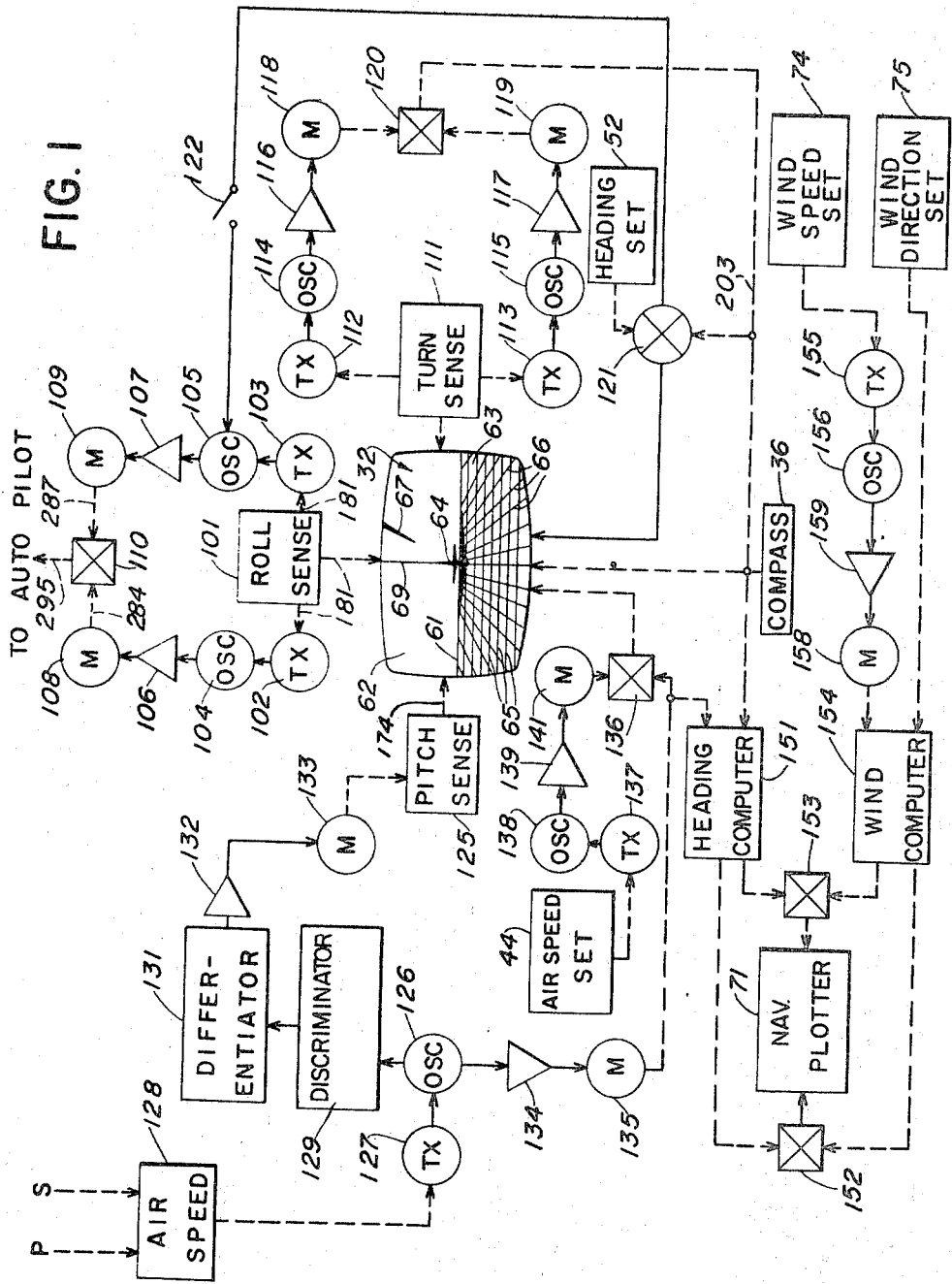
FIG. 1 is a schematic block diagram of a navigation display using control systems constructed in accordance with the present invention.

FIG. 1 is a partially schematic block diagram of an aircraft navigation display utilizing control systems constructed in accordance with the present invention, comprising a main attitude display 32 and a position plotting device 71. As shown therein, the display system comprises a roll sensing device 101. Device 101, preferred forms of which are described in detail hereinafter, senses rotational movement of the aircraft about its longitudinal axis. Device 101 is mechanically connected to the attitude indicator 64 of display 32 and rotates indicator 64 in a clockwise or counterclockwise direction to afford the pilot a direct indication of the roll attitude of the aircraft.

Roll sensing device 101 is also connected to a pair of transducers 102 and 103. Each of the transducers 102 and 103 is constructed to transform mechanical movement of the roll sensing device into an electrical signal that varies in some respect in response to changes in the roll attitude of the aircraft. Typically, each of these transducers may comprise a rotary differential transformer such as a Selsyn motor, or a rotary transducer of the kind described in Patent No. 2,707,232 to Robert Adler.

Transducers 102 and 103 produce complementary outputs; thus, an increase in the output from transducer 102 is matched by a decrease in the output from transducer 103. Transducer 102 is coupled to an oscillator 104 and is utilized to control the frequency of that oscillator, in essentially the same manner as described in the aforementioned patent to Robert Adler. Similarly, the output signal from transducer 103 modulates and controls the operating frequency of a second oscillator 105.

The output signals from oscillators 104 and 105 are supplied to two individual limiting amplifiers 106 and 107, respectively. The output of amplifier 106 is utilized to drive a first synchronous stepping motor 108 and the output of amplifier 107 is supplied to and drives a second similar motor 109. Motors 108 and 109 may comprise conventional magnetic pulse stepping motors. These two motors are employed to drive an auto-pilot; accordingly, some substantial torque output is required from each motor. In a typical system, the available torque output of motors 108 and 109 may be of the order of eleven inch ounces. The two motors 108 and 109 drive a gear differential 110 that is mechanically connected to auto-pilot driving the ailerons of the aircraft.

The turn attitude control system is in many respects substantially similar to that employed for roll attitude control. Thus, the system includes a turn rate sensing device 111. Device 111 may constitute the operating mechanism of a conventional gyro turn indicator. The yaw sensing device may be mechanically connected to indicator 64 of attitude display 32 to move the attitude indicator to the left or to the right of center line 69 to indicate rotational movement of the aircraft about its vertical axis. On the other hand, the turning movements of the aircraft are shown by the movements of a radial grid comprising direction scale 62 and are virtually always accompanied by roll attitude changes. Hence, the connection from device 111 to indicator 64 may be eliminated if desired.

The turn indicator gyro mechanism comprising turn sensing devices 111 is mechanically connected to a pair of variable turns ratio rotary transformers, the transducers 112 and 113. The mechanical connection is such that the signal outputs from transducers 112 and 113 are complementary in nature. That is, a turning movement of the aircraft in one direction increases the amplitude of the output signal from transducer 112 and correspondingly reduces the output signal from transducer 113; a turning movement in the opposite direction increases the output from transducer 113 and decreases the output from transducer 112.

Transducer 112 is electrically coupled, in a frequency control circuit, to an oscillator 114. Oscillator 114, in turn, is coupled through a limiting amplifier 116 to a synchronous pulse stepping motor 118. Similarly, the output signal from transducer 113 modulates the frequency of an oscillator 115, the output signal from oscillator 115 being supplied through an amplifier 117 to a similar small synchronous motor 119.

The two stepping motors 118 and 119 are employed to drive a small gear differential device 120. Differential 120 is mechanically connected to the rotational mechanism for the radial direction scale 66. Device 120 also drives the annular heading scale of the direction indicator, compass 36.

Differential 120 is also utilized to drive an electrical comparator or differential device 121. Although device 121 could be a mechanical device, it preferably constitutes a rotary potentiometer bridge, as described more fully hereinafter, producing an electrical output signal that varies in sign and amplitude depending upon the rotational position of the bridge. Device 121 is also connected to a heading adjustment or setting device 52. Thus, device 121 compares a preset heading in device 52 with the actual heading as determined by integration of turning movements of the aircraft by device 120. The output from device 121 is utilized to drive a differential command pointer 67 through a drive mechanism (not shown) that, in essence, constitutes a conventional electrical meter movement. The differential bridge 121 may also be electrically connected, through a switch 122, to an oscillator 105 in the auto-pilot control circuit to actuate the auto-pilot.

A third major input device for the control system shown in FIG. 1 is a pitch sensing device 125. Pitch sensing device 125 constitutes an acceleration-corrected pendulum mechanism, one embodiment of the sensing device being described in detail hereinafter. The pitch sensing device is mechanically connected to attitude indicator 64 of attitude display 32 and is utilized to move the aircraft indicator upwardly or downwardly to indicate to the pilot any changes in the pitch attitude of the aircraft.

Pitch sensing device 125 should be corrected in accordance with changes in acceleration of the aircraft. A principal component of the correction system is an oscillator 126. The operating frequency of oscillator 126 is varied in accordance with the output signal from a transducer 127, which again may be a rotary differential transformer. In this instance, the transducer is driven by conventional apparatus for determining the airspeed of the aircraft. This apparatus may include a conventional air speed sensing device 128 having the usual static pitot tube connections. Inasmuch as apparatus for determining the air speed of the aircraft, including the pitot-aneroid and static-aneroid sensing apparatus, is well known in the art, there is no necessity for a detailed description or discussion of this portion of the control system.

The output signal from oscillator 126 is supplied to a conventional discriminator 129 connected through a differential circuit 131 to an amplifier 132. Typically, discriminator 129 may be of the audio-frequency limited-pulse phase-multiplier type. A suitable discriminator that may be employed in the system is described and claimed in Patent No. 3,024,419 of Myron L. Anthony, issued Mar. 26, 1962, although a variety of other discriminator circuits may be utilized as desired. The differentiated output of the discriminator is applied to drive a motor 133 in a direction indicative of acceleration or deceleration of the aircraft. Motor 133 is mechanically connected to pitch sensing device 125 to correct the pitch sensing device output for acceleration changes. The amplifier 132 in this circuit is preferably a limiting amplifier.

The output signal from oscillator 126 is also applied through an amplifier 134 to a motor 135. Motor 135, like motors 118 and 119, may comprise a simple and inexpensive magnetic pulse stepping motor having a relatively low output torque. Typically, a motor affording an output torque of approximately one inch ounce may be employed. Motor 135 is utilized as one driving input to a small gear differential 136.

An air speed adjustment or setting device 44 is utilized to actuate a rotory transducer 137. The output signal from transducer 137 is applied to an oscillator 138 to vary the frequency of the oscillator. The output signal from oscillator 138 is supplied through an amplifier 139 to a motor 141. Motor 141 constitutes a second input device for gear differential 136. The output shaft of differential 136 is mechanically connected to apparatus for moving a speed scale comprising the horizontal grid lines 65 of display device 32 either upwardly or downwardly within a ground field 63 to indicate to the pilot whether the aircraft is exceeding or has fallen below a preset air speed.

As noted above, the output of motor 133 is representative of acceleration or deceleration of the aircraft. In some instances, it may be preferable to drive a grid 65 from motor 133, presenting speed information in the main attitude display from the standpoint of acceleration rather than of a differential relative to the preset speed. Where this is done, an auxiliary display for the differential speed, represented by the output of device 136, is preferably provided.

The differential device 120 that drives bridge 121 and the yaw-movement mechanism for attitude indicator 64 also affords a first mechanical input to a heading computer 151. Computer 151 is also mechanically coupled to the output of motor 135. Computer 151, one form of which is described in detail hereinafter, integrates and resolves the air speed information (afforded by the drive from motor 135) and the heading information (taken from differential 120) into appropriate coordinate movements of an indicator bug 73 of a plotter 71. Thus, computer 151 is provided with a north-south output connected to a first differential 152 and with an east-west output connected to a second differential device 153. The two differentials 152 and 153 drive the bug in two coordinate directions to establish the position of the aircraft.

If there were no wind component in the motion of the aircraft, the differential device 152 and 153 would be unnecessary. However, it is necessary to correct the information from heading computer 151 to take cognizance of the speed and direction of the wind.

To correct for wind conditions, the system is provided with an integrating wind computer 154 that is essentially similar in construction to heading computer 151. Computer 154 has two mechanical inputs, one taken directly from a wind direction setting or adjustment device 75. The second input is derived from a wind speed setting device 74, which drives a rotary transducer 155. The output signal from transducer 155 is used to control the frequency of an oscillator 156, oscillator 156 being connected to a drive motor 158 through a suitable amplifier 159. Again, motor 158 may comprise an inexpensive synchronous pulse stepping motor having a minimal torque of the order of one inch ounce.

The principal controls of the system illustrated in FIG. 1 are described in greater detail hereinafter. Briefly, roll sensing device 101 directly drives attitude indicator 64, rotating the indicator in a clockwise or counterclockwise direction to show changes in roll attitude of the aircraft. The same instrument drives the two transducers 102 and 103 to produce output signals, as noted above, that are complementary in amplitude and polarity. The output signals from the transducers control the frequencies of the two oscillators 104 and 105. The output of each oscillator is amplified and limited, to produce a signal of substantially rectangular wave form, by the associated amplifier circuit. In each instance, the output of the oscillator, after amplification and shaping, is employed to drive one of the stepping motors 108 and 109. Motors 108 and 109 drive differential 110, producing a mechanical output from the differential that is directly related to changes in the roll attitude of the aircraft and is suitable for driving the auto-pilot.

The two variable-frequency generators comprising oscillators 104 and 105 and transducers 102 and 103, being connected in push-pull relationship, tend to reduce errors that might result in the system due to thermal drift or aging of system components. The push-pull system employed also provides automatic correction for non-linearity of transducers 102 and 103. The overall stability of the illustrated system is of the order of 0.01%, using commercial components and known stable circuits, and this accuracy can be maintained over long periods of time and under a wide variety of operating conditions.

The same basic circuit is employed in connection with turn sensing device 111.

As noted above, the turn sensing device 111 may be connected mechanically to attitude indicator 64, but this is not essential because changes in yaw attitude are reflected in changes of aircraft heading, indicated by the rotational movement of the direction scale comprising radial lines 66 in display 32. The principal output from the turn sensing device 111, accordingly, is that derived from the two transducers 112 and 113, which directly control the operating frequencies of oscillators 114 and 115 respectively.

Changes in frequencies of the two oscillators are reflected in variations in rotational speed of the two stepping motors 118 and 119 driving the small gear differential 120. As long as the aircraft flies on a straight line without turning, sensing device 111 detects no change in the yaw attitude of the aircraft. Under these conditions, oscillators 114 and 115 operate at the same frequency and motors 118 and 119 rotate at substantially identical speeds. Accordingly, the output shatf of differential device 120 does not rotate and the radial indicator lines 66 in the display remain stationary. Whenever there is a turning movement of the aircraft, one of the motors 118 and 119 is driven faster than the other, there is an output from differential 120, and the radial grid comprising lines 66 rotates to indicate to the pilot that the aircraft is turning either left or right.

The foregoing description of performance of the turn rate control portion of the system is based upon the assumption that there is no change in the set heading. When a change in heading is desired, the new heading is set into the system by device 52, which adjusts the electrical bridge differential device 121. The resultant disturbance of the bridge balance causes the bridge to produce an output signal that drives the meter movement controlling the differential turn command pointer 67. As a consequence, the command pointer moves to the right or the left, depending upon the direction in which it is necessary to turn the aircraft in order to achieve the desired new heading. The pilot must then turn the aircraft toward the new heading; as the new preset heading is approached, bridge 121 returns toward its balanced condition and command pointer 67 moves back toward its normal alignment with the center line 69 of the display. As the aircraft nears the new heading, the increasing proximity of command pointer 67 to center line 69 automatically guides the pilot in making a smooth flareout from his turn. Of course, during the period in which the aircraft actually turns, the radial grid 66 rotates, so that the pilot is fully aware of the fact that the aircraft is turning.

In the initial portion of each flight, while the aircraft is being brought to the desired altitude, attitude, and heading, it is usually preferable to leave switch 122 open. Once the aircraft is flying on the desired heading, switch 122 can be closed. Thereafter, if a new heading is set in device 52, the unbalanced output signal from bridge 121 resulting from the heading change is applied to oscillator 105 to create an unbalanced condition between the operating frequency of oscillator 105 and oscillator 104. The resulting unbalanced condition in the roll control system is interpreted by that system as a banking movement of the aircraft, even though no actual bank has occurred and the roll sensing device 101 continues to show that the aircraft is in level flight. The autopilot connected to differential device 110 automatically operates to correct this error signal, representing an apparent banking of the aircraft, banking the plane in the opposite direction and therefore turning the aircraft.

When the turning aircraft reaches the new heading that has been set into device 52, the output from bridge 121 is again reduced to a zero level and there is no further output signal supplied from the bridge to oscillator 105. Accordingly, the auto-pilot no longer attempts to correct for the error signal produced by the heading change, and flight is resumed on a level basis.

The control system of FIG. 1 moves the horizontal grid lines 65, sometimes referred to herein as the speed grid or speed scale, in accordance with rate variations between the air speed setting device 54 and the actual air speed determined by device 128. It will be observed that the control system is essentially identical to that for the roll and turn control systems except that two input devices are used instead of one. Motor 135 is actuated in accordance with directly sensed air speed information from device 128, the control components including the air speed sensing device 128, transducer 127, oscillator 126, amplifier 134 and motor 135. Motor 141, on the other hand, is driven at a speed determined by the setting of device 44 through the chain of control devices comprising transducer 137, oscillator 138 and amplifier 139. Deviations of the actual air speed from the preset air speed are reflected in rotational movement of the output shaft of differential 136, which is driven by the two motors 135 and 141.

If the actual air speed exceeds the preset air speed, then the output shaft of differential 136 drives the speed grid 65 downwardly within window 32, giving the direct illusion that the plane is rushing forwardly over the ground at an excessive rate. Conversely, if the actual air speed is below the preset air speed, the lines of the speed scale move forwardly within the window, creating the illusion that the aircraft has slowed down to a point where it is "backing up." In connection with the speed grid 65 and the radial turning grid 66, rate information is employed instead of actual performance information because the objective of the system is to inform the pilot only with respect to changes from the predetermined flight conditions. Stated differently, there is no necessity for the pilot to gauge the actual speed of movement of either of these grids; if either grid moves, then the pilot knows that the aircraft has deviated from the planned flight.

Pitch sensing device 125 moves indicator 64 upwardly and downwardly within the display field of device 32 to indicate diving or climbing movement of the aircraft. The output from oscillator 126, which is indicative of changes in air speed, is discriminated, differentiated, and amplified in circuits 129, 131 and 132 to obtain a DC signal having an amplitude proportional to acceleration of the aircraft and a polarity representative of the direction of that acceleration. That is, the polarity of the output signal from circuit 132 indicates whether the aircraft is accelerating in a forward direction or is decelerating. Motor 133, which is a small DC magnetic torque motor, rotates in a direction determined by the polarity of the input signal and through an arc determined by the amplitude of that signal. This affords a correction in pitch sensing device 125 to prevent pitch errors in the sensing device, which would otherwise be occasioned by changes in acceleration of the aircraft, from being displayed. Thus, if the aircraft accelerates forwardly but maintains level flight, pitch sensing device 125 tends to produce an output indicating that the aircraft is climbing. This is corrected by the motor 133 so that the display continues to afford an accurate indication of the actual pitch attitude of the aircraft. The same correction applies, of course, upon deceleration.

Heading computer 151, which is described in greater detail hereinafter, resolves the actual heading information derived from differential 120 of the air speed information from motor 135 into two integrated coordinate movements. The computer is provided with two output shafts, one of which drives differential 152 and the other of which drives differential 153. If there were no wind, the outputs of computer 151 could be used directly to drive the position indicator bug of plotter 71 to show the aircraft position. Again, it is necessary to correct this information for wind conditions and this is accomplished by the coordinate outputs of the similar computer 154. The computers are described in greater detail hereinafter.

ROLL ATTITUDE CONTROL SYSTEM

The principal components of the roll attitude control system used to actuate the main display 32 are shown in substantial detail in FIGS. 2 through 5. A modified form of the roll attitude sensing device is shown in FIG. 6.

FIG. 2 illustrates, in detail schematic form, the operating circuits for the transducer 102, oscillator 104, limiting amplifier 106 and motor 108. Transducer 103 comprises a rotary transformer that includes a rotatable core 220 connected to the shaft 181 of a roll sensing device 101A (FIG. 4) and carrying a winding 221. Core 220 rotates with respect to a stationary core 222 upon which are wound a primary winding 223 and a secondary winding 224. One terminal of rotatable winding 221 is returned to ground through a biasing circuit comprising a resistor 225 connected in parallel with a capacitor 226. This same terminal of winding 221 is connected to an adjustable bias voltage supply through a resistor 227. The other terminal of rotatable winding 221 is connected to one terminal of an inductance 228 which is connected in series with a capacitor 229 that is returned to ground. Capacitor 229 and coil 228 constitute the frequency-determining circuit of oscillator 104.

Oscillator 104 includes a transistor 231 having its base electrode connected to the common terminal of capacitor 229 and coil 228. The emitter of transistor 231 is connected to one end of primary winding 223 of the transformer, the other terminal of this winding being returned to ground through a parallel RC circuit comprising a resistor 232 and a capacitor 233. The collector of the transistor is connected to a negative voltage supply herein designated as C—.

The output from oscillator 104 is taken from the secondary winding 224 of the transformer. The electrical center point of the transformer winding 224 is grounded. One terminal of the winding is connected through a resistor 234 to the base electrode of a transistor 235. The other terminal of winding 224 is connected through a resistor 236 to the base electrode of a second transistor 237. The emitters of the two transistors are retuned to system ground. The collector of transistor 235 is connected to the C— supply through a load resistor 238. The collector of transistor 237 is connected to the C— supply through a load resistor 239. The collector of transistor 235 is also connected back to the base electrode of transistor 231 through a feedback circuit comprising the series combination of a capacitor 241 and a resistor 242.

Transistors 235 and 237 comprise the first push-pull stage of limiter-amplifier 106; this stage functions primarily as a limiter. The second stage of the amplifier is also a push-pull circuit and comprises two transistors 245 and 247. The base electrode of transistor 245 is coupled to the collector of transistor 235 in the preceding limiter stage by a coupling circuit that comprises a series capacitor 244 and a resistor 246 that returns the base electrode to ground. A similar coupling circuit comprising a capacitor 248 and a resistor 249 couples the base electrode of transistor 247 to the collector electrode of transistor 237. The emitter electrodes of transistors 245 and 247 are returned to ground through two resistors 251 and 252 respectively.

Motor 108 is a conventional pulse motor having a split input winding comprising two coils 253 and 254. The two windings are connected together and returned to the C— supply. One terminal of winding 253 is connected to the collector of transistor 245. The corresponding terminal of winding 254 is connected to the collector of transistor 247.

The operating circuit for the rotary transducer 102 and oscillator 104, as shown in FIG. 2, is essentially similar to the circuit described in Patent No. 2,707,232 to Robert Adler except that the present circuit is constructed with transistors instead of vacuum tubes. An essentially similar circuit is also shown in Patent No. 3,038,960 of Robert Adler and Myron L. Anthony. Accordingly, only a brief description of the circuit operation is presented herein.

Insofar as oscillator 104 is concerned, the circuit of FIG. 2 operates as an emitter follower having a frequency determined by the capacitor 229 and the inductance 228, the inductance of the transformer winding 221 being very small in comparison to coil 228. The feedback circuit of the oscillator includes the transistor 235, which is biased to operate as a limiting amplifier, and the coupling circuit comprising capacitor 241 and resistor 242. The fundamental operating frequency for the oscillator 104 is not critical, but is selected to be within the operating capabilities of motor 108. Typically, the oscillator may operate with a center frequency of the order of one hundred sixty cycles per second.

With the circuit in operation, rotation of the shaft 181 connected to core 220 may be employed to rotate the core and winding 221 and thereby develop in the winding 221 a signal which may be either a bucking or a boosting signal relative to the bias signal applied to the winding 221. For an induced signal of one polarity, the apparent capacitance of the circuit 228, 229, is increased; an induced signal of opposite polarity results in an apparent decrease in the capacitance of the circuit. Accordingly, rotation of core 220 effectively increases or decreases the operating frequency of the oscillator 104, depending upon the direction of rotation. Furthermore, the amount of the frequency change is determined by the angle through which the rotary transformer core is rotated.

The output signal form oscillator 104, derived at the secondary winding 224 of the transformer, is amplified in circuit 106. This circuit functions as a limiting amplifier, producing a square wave signal of essentially constant amplitude at the output, taken from the collector electrodes of transistors 245 and 247. Pulse motor 108 is always driven in a given direction, the speed of rotation of the motor being directly related to and determined by the frequency of the output signal from oscillator 104.

As noted hereinabove, the basic circuit employed for devices 102, 104, 106 and 108 (see FIGS. 1 and 2) is also employed for the complementary portion of the roll attitude control system comprising transducer 103, oscillator 105, amplifier 107 and motor 109. Accordingly, the latter circuit is not shown in detail in the drawings. The two motors 108 and 109 (FIG. 1) drive the gear differential 110 at a rate that is determined by the difference, if any, in the output speeds of the two motors. Differential 110 is described in detail hereinafter in connection with FIG. 5.

FIGS. 3 and 4 illustrate one form of roll sensing device 101A that may be utilized as the roll sensing element 101 (FIG. 1) of the roll attitude control system. In FIG. 3, the size of device 101A has been greatly exaggerated; this view is presented solely to illustrate the orientation of device 101A in an aircraft.

As shown in FIGS. 3 and 4, device 101A comprises a frame 260 of rectangular configuration including four side frame members 261, 262, 263 and 264. Frame 260 is mounted in fixed position within the aircraft 265 (FIG. 3) with the frame members 262 and 264 extending parallel to the longitudinal axis 266 of the aircraft and with frame members 261 and 263 extending parallel to the horizontal transverse axis 267 of the aircraft.

The shaft 181 extends across frame 260 between frame members 261 and 263; it is this shaft that drives transducers 102 and 103 and attitude indicator 64 (FIGS. 1 and 2). Shaft 256 is aligned parallel with the longitudinal axis 266 of the aircraft and preferably is centered on that axis. Within the central opening of rectangular frame 260, a mounting ring 268 is mounted on the shaft. Preferably, the shaft 181 is constructed in two sections that are bridged by the mounting ring 268, the connection between the two shaft sections and the mounting ring being a rigid mount such that the shaft, to all intents and purposes, is continuous.

A gyro 269 comprising a small constant speed electrical motor 270 and a flywheel 271 mounted on the motor shaft is supported within mounting ring 268. With the illustrated construction, it is seen that the gyro 269 is a semi-rigid device that is limited to pivotal movement about the axis 266. Furthermore, it should be noted that axis 266 is normal to the axis of rotation 272 of the gyro.

Device 101A further includes a pendulum 273 comprising a depending rigid shaft 274 affixed to mounting ring 268 and a weight 275 that is mounted upon shaft 274. Preferably, weight 275 is threaded or otherwise adjustably mounted upon the shaft 274 so that the weight can be adjusted upwardly or downwardly of the shaft for dynamic balancing of sensing device 101. It will be seen that the mounting arrangement for pendulum 273 limits the pendulum to pivotal movement about the axis 266 which, as noted above, is parallel to or coincident with the longitudinal axis of the aircraft.

Rotational movement of shaft 181, in device 101A, is conjointly determined by the effect of the precession torque of gyro 269 and the centrifugal torque of pendulum 273. Assuming initially that aircraft 265 is rotated or rolled about its longitudinal axis 266 with no turning movement of the aircraft, it is seen that pendulum 273 rotates shaft 181 through an angle determined by the rolling movement of the aircraft. As long as there is no turning movement of the aircraft, gyro 269 applies no precession torque to the shaft. Accordingly, the rotational movement of the shaft may be taken directly as an accurate indication of the roll attitude of the aircraft.

Ordinarily, any rolling or banking movement of the aircraft is accompanied by a turning movement of the aircraft about some center, usually located a substantial distance from the aircraft. It is possible, however, to turn the aircraft without a rolling movement thereof. If it is assumed that the aircraft is engaged in a flat turn along the arc 277, it is seen that the centrifugal force of pendulum 273, indicated by the arrow CF, tends to rotate shaft 181 in a counterclockwise direction as indicated by arrow CT. That is, arrow CT represents the centrifugal torque applied to shaft 181 as a result of the angular acceleration of the aircraft.

If uncorrected, torque CT would give an erroneous indication of the roll attitude of the aircraft since, as noted above, it has been assumed that the aircraft is proceeding in a perfectly flat turn and has not been banked. But gyro 269 exerts a compensating precession torque PT on shaft 181 that is directed oppositely to the centrifugal torque CT. With proper adjustment of the pendulum weight 275, the precession torque PT and the centrifugal torque CT may be equalized for a selected normal operating speed for the aircraft. Device 101A may be calibrated to permit adjustment of the weight for different speeds, such as the cruising speed of the aircraft, economy cruising speed, and like preset speeds at which the aircraft is normally operated.

In a banked turn, that portion of the torque exerted upon shaft 181 that is the result of the angular velocity of the aircraft is effectively cancelled by the opposing precession torque of gyro 269. The differential torque exerted by the pendulum as a result of banking of the aircraft results in rotational movement of shaft 181 that affords an accurate indication of the roll attitude of the aircraft. As noted above, shaft 181 is connected to the aircraft indicator 64 of the main display 32 (see FIG. 1) to provide the pilot with a continuous indication of the instantaneous roll attitude of the aircraft. As can be seen from the foregoing description, display indication is the sum of the precession torque of the gyro 269 and the free pivotal movement of the pendulum 273, the precession torque being equal to that component of the pendulum movement that is determined by centrifugal force on the pendulum resulting from turning movement of the aircraft.

Roll sensing device 101A is, of course, the input device for the circuit of FIG. 2 in the roll attitude control system. The output device is the differential 110. One form of gear differential 110A that may be employed is illustrated in FIG. 5.

As shown in FIG. 5, differential 110A includes a frame 281 of generally rectangular configuration having two hollow stub shafts 282 and 283 affixed to the frame and projecting outwardly of opposite sides of the frame in alignment with each other. The shaft 284 of motor 108 extends through hollow shaft 282 and through the wall of the frame into the central opening 286 in the interior of the frame. A small gear 285 is mounted on the end of shaft 284. Similarly, the output shaft 287 of motor 109 extends through the hollow shaft 283 into the interior opening 286 of frame 281, the two motor shafts being coaxially aligned. A small bevel gear 288 is mounted on the end of shaft 287. Gears 285 and 288 are both disposed in meshing engagement with a pair of complementary bevel gears 289 mounted upon a shaft 291 that extends across the central opening 286 of the differential frame 281 normal to the common axis of shafts 284 and 287.

A pinion gear 292 is affixed to shaft 283. Gear 292 is disposed in meshing engagement with a spur gear 294 mounted upon the output shaft 295 of the differential 110.

Gear differential devices such as device 110A are well known in the art and are commercially available. Consequently, only a brief description of operation of the gear differential is presented herein. The outputs of shafts 284 and 287 of motors 108 and 109, respectively, rotate in opposite directions. As long as the shaft speeds are equal frame 281 remains stationary. Whenever one of the motors rotates its shaft at a higher speed than the shaft for the other motor, however, this speed differential is translated into rotational movement of frame 281, through gears 285, 288 and 289. Furthermore, the direction of rotation of frame 281 is determined by and is indicative of the motor that has exceeded the speed of the other motor.

Thus, if motor 108 runs faster than motor 109, gear differential frame 281 may rotate in a clockwise direction. Conversely, if motor 109 exceeds the speed of motor 108, then the gear box rotates in a counterclockwise direction. The rotational movement of frame 281 is translated to output shaft 295 through gears 292 and 294. It is thus seen that the angular displacement of shaft 295 is the time integral of the cumulative variations in rotational speeds of motors 108 and 109 with respect to each other.

Fig. 5A illustrates the relationship between angular displacement of shaft 195 and the differential in rotational speeds of motors 108 and 109. As shown by the linear plot 298 in FIG. 5A, the shaft displacement should be a direct linear function of the speed differential and should pass through a point of zero displacement when the speeds are equal.

With an integrating device required to operate through or about a zero point, as illustrated in FIG. 5A, there is a substantial tendency toward the introduction of hysteresis error at or near the zero point. This is generally indicated by the dash line plot 299, showing the pattern followed by many integrating devices; note the distorted "dead" band near the zero point. A hysteresis error of this kind cannot be tolerated in an aircraft instrumentation system, particularly where heading or direction is derived from the time integral of the rate of turn. Generally speaking, the digitized push-pull drive and gear differential integrator system of the present system, as disclosed in FIGS. 1, 2 and 5, reduces this and other integrating errors to a minimum. Over long periods of time, observed error has been held below 0.01%.

Further reduction of hysteresis error in the integrating system, and particularly in the differential device, though normally not essential, can be accomplished by continually varying the motor speeds, complementally to each other, over a relatively small range. This may be accomplished by a small-amplitude balanced repetitive mechanical movement of the rotary transducer core 220. The resulting "dithering" movement of the rotary transducer is effective to insure against any possible introduction of a "dead" band near the zero position, of the form illustrated by dash line 299 in FIG. 5A, due to friction in the transducer or the sensing device.

FIG. 6 illustrates a modified form 101B of a roll sensing device that may be employed as the roll sensing apparatus 101 in the control system of FIG. 1. At the left-hand side of device 101B, as illustrated in FIG. 6, there is a conventional single-gimbal pivoted gyro 310 comprising a small constant speed high speed motor with a flywheel. Gyro 310 is so mounted that the pivotal axis 266A of the gyro is parallel to or coincident with the longitudinal axis of the aircraft. The rotational axis 272A of the gyro is parallel to the transverse axis of the aircraft so that the precession torque of the gyro is proportional to angular velocity of the aircraft about an axis parallel to the vertical axis of the aircraft.

A rheostat arm 311 is connected to the gyro 310, the resistance 312 of the rheostat being connected in series with two batteries 313 and 314. Common terminal 315 of the batteries and the rheostat arm 311 comprise the output terminals. An indicating instrument, a voltmeter 316, may be included in series in this circuit. This completes a quite conventional instrument of the kind once referred to as a "turn indicator" that actually measures angular velocity of the aircraft about its vertical axis.

Device 101B further includes a pendulum 320 that is mechanically connected to a rheostat arm 321. The pivotal axis 266B of pendulum 320 is parallel to and preferably coincident with the longitudinal axis of the aircraft. Consequently, the pivotal movement of pendulum 320 represents the combined effect of rotation of the aircraft about its longitudinal axis and angular turning velocity of the aircraft about an axis parallel to the vertical axis of the aircraft.

The resistance 322 of the rheostat that includes arm 321 is connected in series with two batteries 323 and 324. The common terminal 325 and the rheostat arm 321 comprise the output terminals. An indicating voltmeter 326 may be incorporated in series in this circuit. This arrangement is essentially the same as a conventional pendulum-type instrument of the kind known as a "bank indicator."

For accurate continuous indication of the roll attitude of the aircraft, a voltmeter 330 is connected between the gyro-controlled and pendulum-controlled circuits, from terminal 315 to terminal 325. Thus, instrument 330 affords an indication of the voltage differential, if any, between terminals 315 and 325. A speed correction circuit 331 may be connected to the attitude indicating instrument 330 as discussed hereinafter.

In a perfectly flat turn, arm 311 of the gyro-controlled rheostat is displaced clockwise or counterclockwise, depending upon the direction of the turn, in response to the precession torque of the gyro. At the same time, pendulum 320 is displaced angularly as a result of the angular acceleration produced by the turn. The system may be calibrated, particularly by adjustment of pendulum 320, so that the voltages across resistors 317 and 327 are equal during a flat turn. With no unbalanced condition present, attitude indicator 330 properly shows that the aircraft is maintaining level flight.

If the aircraft is rolled about its longitudinal axis, without turning, the rheostat arm 311 is not displaced, there being no precession torque output from gyro 310. But pendulum 320 is displaced in a direction and by an amount determined by the banking or rolling of the aircraft. As a consequence, a voltage of given direction and amplitude is developed across resistor 322 and this voltage is sensed and indicated by the attitude instrument 330.

In a banked turn, the gravity-induced movement of pendulum 320 resulting from banking of the aircraft is partially or completely offset by the centrifugal force applied to the pendulum as a result of angular acceleration of the aircraft. By definition, in a perfectly banked turn, the two forces are equal, gravity balancing the angular acceleration on the pendulum. Consequently, the bank circuit controlled by the pendulum remains balanced. But the turning motion of the aircraft produces a substantial unbalanced condition in the circuit controlled by gyro 310, resulting in the development of an appreciable voltage differential at terminal 315 as compared with terminal 325. The polarity of this voltage difference is determined by the direction of the turn, which is of course a function of the direction in which the plane has been banked. Consequently, the unbalanced voltage applied to attitude instrument 330 accurately reflects the changed attitude of the aircraft. In an imperfectly banked turn, of course, the voltages developed at terminals 315 and 325, and applied to instrument 330, are unequal; instrument 330 resolves the two voltages and affords a direct indication of aircraft attitude.

As in the case of device 101A, roll sensing apparatus 101B may be affected somewhat by changes in the forward speed of the aircraft. This is not a serious limitation on either device, however, since aircraft are normally operated within a rather narrow speed range. If necessary, a velocity correction signal may be applied to the attitude indicator 330 from an appropriate correction circuit 331.

A conventional meter movement suffices to drive instrument 330 for a roll attitude display not integrated with the display of additional attitude information. For an integrated display, a suitable motor may be used.

PITCH ATTITUDE CONTROL SYSTEM

FIGS. 2 and 7 through 9 illustrate the principal operating components for the pitch attitude control system that controls vertical movements of attitude indicator 64 in the main display 32 (see FIG. 1). As noted above, the digitized integrating circuits for this portion of the control system can be essentially identical to those used in the roll attitude control system and described hereinabove in connection with FIG. 2. Accordingly, there is no need to repeat the description of this portion of the pitch control system.

Figure 7:
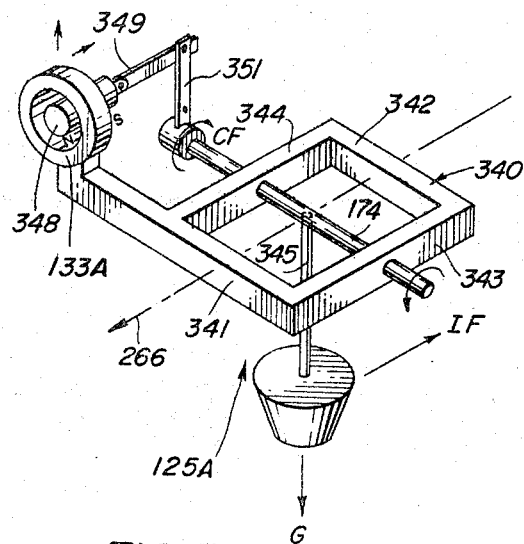
FIG. 7 is a perspective view of one form of pitch sensing device that may be used in the control system.

FIG. 7 illustrates a first simple form of pitch sensing device 125A that may be incorporated in the control system of FIG. 1. Device 125A comprises a frame 340 of rectangular configuration comprising front and rear frame members 341 and 342 and opposed side frame members 343 and 344. Side frame members 343 and 344 are parallel to the longitudinal axis 266 of the aircraft.

Pitch sensing device 125A includes a pendulum 345 that is suspended from the shaft 174 comprising the output shaft for the device. Shaft 174 extends across frame 340, being supported in and journalled in suitable bearings in the side frame members 343 and 344. thus, the axis of rotation of shaft 174, which is the rotational axis for pendulum 345, is parallel to the transverse axis of the aircraft and is normal to the longitudinal axis of the aircraft.

The front frame member 341 of frame 340 is extended and a solenoid device 133A is mounted upon the extension portion thereof. Device 133A comprises a coil that encompasses a magnetic armature 348. Armature 348 is mounted upon a support arm 349. Support arm 349 is pivotally connected to a lever 351 affixed to one end of shaft 174. Solenoid 133A is provided with suitable electrical connections and is energized in accordance with a speed correction signal derived from the discriminator differentiator circuit 132 as described hereinafter. Thus, for this particular form of pitch sensing device, solenoid device 133A represents the motor 133 shown in the control circuit diagram of FIG. 1.

In operation, when the plane remains in level flight, pendulum 345 points directly downward. If the aircraft noses down, the pendulum is displaced, rotating shaft 174 and affording a direct indication that the pitch attitude of the aircraft has changed. With the display mechanism illustrated in FIG. 1, this change in pitch is indicated by a vertical downward movement of aircraft indicator 64. On the other hand, if the nose of the plane is brought up, pendulum 345 rotates shaft 174 in the opposite direction. This affords a positive indication of the change in pitch attitude and is shown as an upward movement of the aircraft indicator 64.

The simple pendulum device of FIG. 7 would be subject to error as a result of acceleration of the aircraft, but this error is corrected by device 133A. Thus, if the aircraft is accelerated in a forward direction, the resulting inertia force IF on pendulum 345 tends to pivot shaft 174 in a counterclockwise direction, indicating that the aircraft has nosed up. But this tendency on the part of the pendulum is counteracted by the solenoid 133A, which is energized by the acceleration signal from discriminator differentiator 132. Similarly, inertia forces on the pendulum resulting from deceleration of the aircraft are compensated by solenoid 133A. With proper calibration, accordingly, device 125A may be effectively corrected for changes in acceleration of the aircraft.

Device 125A, as illustrated, leaves pendulum 345 free to rotate through a complete circular arc. Hence, the pendulum, if free of all external influences other than gravity, would point downwardly for all attitudes of the aircraft. But the acceleration correction solenoid 133A can only respond to displacements of much smaller amplitude; typically, the acceleration correction may be made operative over a total change in pitch of about plus or minus 30°. This is not a serious disadvantage, since sharp diving or climbing movements are not encouraged in the operation of most aircraft, and indeed, should be avoided, especially under IFR conditions. However, acceleration correction over a full 360° arc can be provided by substituting a permanent magnet rotary solenoid for the simple toroidal core linear solenoid device 133A.

Even with a rotary solenoid correction device, pitch sensing device 125A is not fully accurate for aerobatic maneuvers such as a full loop. The pendulum is subject to disturbances resulting from centrifugal force if the attitude of the aircraft is changed severely as in a looping maneuver. Thus, at the end of the first 90° movement in a loop, the normal gravitational force would tend to deflect the pendulum to a position parallel to the floor of the aircraft. But the centrifugal force on the pendulum resulting from the turn of the aircraft in the vertical plane is normal to the aircraft floor and causes the pendulum to move radially outwardly from the center of the loop, resulting in a pitch indication that is not entirely accurate. Nevertheless, the direction of displacement of the pendulum is still correct with respect to the basic aircraft attitude and thus always permits correction of the aircraft to resume level flight.

Figure 8:
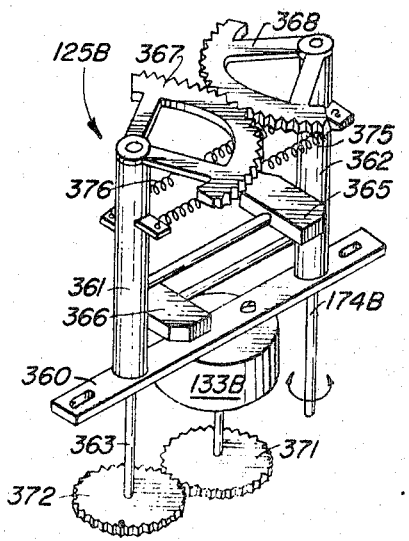
FIG. 8 illustrates, in perspective, another form of pitch sensing device.

FIG. 8 illustrates another embodiment of pitch sensing device in the form of a dual pendulum mechanism 125B. Device 125B comprises a base frame member 360 oriented transversely of the longitudinal aircraft axis 266 and extending substantially parallel to the horizontal aircraft axis. A pair of vertically extending hollow support and bearing members 361 and 362 are mounted at the opposite ends of frame member 360. A shaft 363 extends through bearing post 361 and projects downwardly below frame member 360. A similar shaft 174B, which is the output shaft for the device, extends through bearing post 362 and projects below frame member 360.

A first horizontal pendulum member 365 is affixed to shaft 363, the pendulum shaft projecting outwardly through bearing post 361 through a suitable slot in the bearing post. A second similar horizontal pendulum member 366 is mounted upon shaft 174B. At the top of shaft 363, a sectional gear 367 is affixed to the shaft. Gear 367 is disposed in meshing engagement with a similar gear 368 that is affixed to the upper end of shaft 174B.

A rotary solenoid motor 133B is mounted upon the central portion of frame member 360. The lower end of the shaft for motor 133B carries a pinion gear 371. Gear 371 is aligned in meshing engagement with a gear 372 that is mounted on the lower end of shaft 363. Solenoid motor 133B is electrically connected to discriminator differentiator circuit 132. A pair of springs 375 and 376, each attached to one of the bearing posts and connected to the shaft in the other bearing post, normally maintain the mechanism in the initial or zero position shown in FIG. 8.

It will be recognized that the pitch sensing device 125B, as illustrated in FIG. 8, comprises a balanced "tilt" pendulum. Again, movement of the pendulum mechanism is compensated for change in acceleration by means of the rotary motor 133B and its driving connection to the shaft 363 of pendulum 365. The pendulum assembly is spring biased to its center position, representative of level flight. The displacement of the two pendulums 365 and 366 is relatively small even for extreme changes in pitch attitude.

In the balanced pendulum mechanism of FIG. 8, the two tilt pendulums 365 and 366 are free to move only in a plane parallel to the floor of the aircraft. The orientation of the two pendulums, one on the left and one on the right, tends to cancel any transient disturbances caused by slipping motion of the aircraft in a sideways direction.

An important feature of device 125B is that it tends to minimize any disturbing effects due to centrifugal force resulting from extreme changes in pitch attitude. The centrifugal force on the two pendulums is proportional to the angular acceleration and to the sine of the angle of displacement of the pendulum with reference to the floor of the aircraft. As long as the pendulums are restrained by the springs 375 and 376 and are prevented from large excursions from their normal positions, the centrifugal force component, acting in the direction of gravity, will produce only very small disturbing forces. Thus, device 125B continues to afford substantially accurate pitch information even when the aircraft goes through relatively large pitch excursions and extremes of acceleration.

Figure 9:
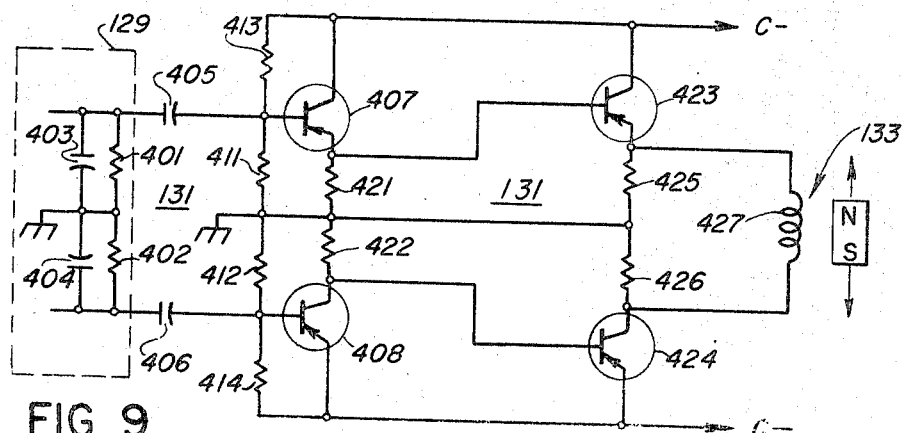
FIG. 9 is a schematic circuit diagram of an acceleration correction circuit usable with the pitch sensing devices of FIGS. 7 and 8.

FIG. 9 illustrates a substantial portion of the operating circuits that control the pitch correction solenoid motor 133 (see FIG. 1). The initial portion of this circuit is the conventional frequency discriminator 129; because a number of suitable discriminator circuits are well known in the art, the circuit has not been shown in detail. By way of example, one suitable form of discriminator that may be employed, and that affords adequate accuracy and consistency in operation, is that shown in Patent No. 3,024,419 of Myron L. Anthony. In FIG. 9, only the output portion of discriminator 129 is illustrated, comprising the two output resistors 401 and 402, these two resistors being connected together in balanced relation and returned to system ground. Two capacitors 403 and 404 are connected in parallel with resistors 401 and 402 respectively.

The first output resistor 401 of the discriminator circuit is connected through a coupling capacitor 405 to the base electrode of a first transistor 407. Similarly, the output resistor 402 of the discriminator is coupled through a capacitor 406 to the base electrode of a transistor 408. Capacitors 405 and 406 constitute the differentiating circuit 131. The base electrode of transistor 407 is returned to ground through a resistor 411 and is also connected to a DC supply, herein designated as C—, through a resistor 413. Similarly, the base electrode of transistor 408 is connected to the C— supply through a resistor 414 and to system ground through a resistor 412.

The emitter electrodes of transistors 407 and 408 are returned to ground through two load resistors 421 and 422 respectively. The collector of each of these two transistors is connected directly to the C— supply. The emitter of transistor 407 is connected to the base electrode of a transistor 423, whereas the emitter of transistor 408 is connected to the base of a further transistor 424. The collectors of transistors 423 and 424 are each connected directly to the C— supply. The emitter electrodes of these two transistors are returned to ground by means of two respective load resistors 424 and 426. The emitter electrodes are also connected to the end terminals of a solenoid coil 427 constituting the operating winding for the solenoid motor 133.

The output signal from discriminator circuit 129, including the output resistors 401 and 402, is a push-pull DC signal. The amplitude of this signal is proportional to the air speed of the aircraft, since the operating frequency of oscillator 126 (FIG. 1) that drives the discriminator varies in frequency in accordance with air speed. The voltages applied to the base electrodes of transistors 407 and 408, through coupling capacitors 405 and 406, circuit 131, vary in accordance with the first time derivative of the air speed voltage. Accordingly, the input signal to the push-pull limiter amplifier comprising transistors 407 and 408 is proportional to the rate of change of air speed of the aircraft and hence to the acceleration of the aircraft.

Because the two input translators 407 and 408 in the operating circuit for solenoid motor 133 are connected as emitter followers, they present a high load impedance for the discriminator output. The amplifiers comprising transistors 407 and 408 drive the second push-pull stage comprising transistors 423 and 424, the two sides of this stage also being connected, in each instance, in an emitter follower configuration. This affords a low resistance source for energizing the operating winding 427 of the correction solenoid 133. Due to the short-circuiting effect of this low impedance source in the terminal stage of amplifier 132, the solenoid is highly damped and affords effective and controllable mechanical velocity damping to the solenoid armature and to the pitch pendulum system.

TURN AND HEADING CONTROL SYSTEM

As noted hereinabove, turn rate sensing device 111 may constitute a substantially conventional gyro turn indicator. Accordingly, there is no necessity for a detailed illustration or description of the mechanism employed. By the same token, the balanced digital integrating system utilized to drive differential device 120, the output device for the turn and heading control system, is essentially identical, on each side, with the arrangement described in detail hereinabove in connection with FIG. 2.

Figure 10:
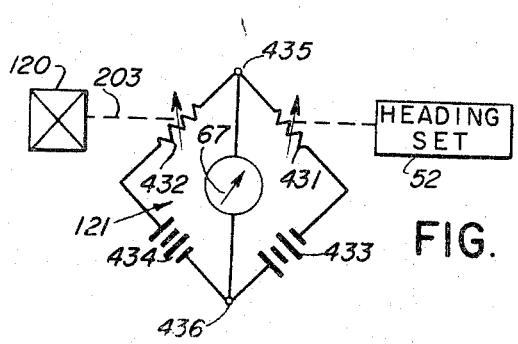
FIG. 10 is a schematic circuit diagram of an electrical differential device used in the heading control system of the invention.

One portion of the turn and heading control system that is shown in detail in the drawings is the simple bridge circuit 121 illustrated in FIG. 10. As shown therein, the heading set device 52 is mechanically connected to a first variable resistance 431 that is connected in one leg of a bridge circuit. A second variable resistance 432 is connected in a corresponding leg of the bridge circuit. Resistance 432 is mechanically connected to the output shaft 203 of differential 120. The remaining legs of the bridge include two individual batteries or power supplies 433 and 434. The meter movement that drives command pointer 67 is connected across the bridge from the common terminal 435 of resistors 431 and 432 to the common terminal 436 of the two voltage supplies.

When the aircraft is in straight level flight on a preselected heading, resistors 431 and 432 are balanced with respect to their respective voltage supplies and the voltage and current between terminals 435 and 436 is negligible. Under these circumstances, the drive for pointer 67 maintains the pointer in vertical alignment with the center line 69 of the display (see FIG. 1), indicating to the pilot that the desired heading is being followed.

If the heading is now changed by adjusting device 52, it is apparent that the bridge circuit 121 becomes unbalanced. The pilot turns the aircraft, the turning movement being detected by sensing device 111 and integrated by the digital control circuits and associated output devices comprising motors 118 and 119 and differential 120. The output from differential 120 adjusts resistor 432. When this resistor has reached a balanced condition with respect to the setting of resistor 431, the voltage and current across the bridge are again reduced to zero and pointer 67 is returned to vertical alignment in the display.

A turning movement of the aircraft, from whatever cause, where there has been no corresponding change in the pre-set heading, also unbalances the bridge circuit 121. Again, the pilot must turn the aircraft to bring the differential bridge 121 into balance and return the command pointer to its normal head-on position. In both instances, the approach of command pointer 67 to vertical line 69 shows the pilot that he is nearing the correct heading and enables him to anticipate the necessity of flaring out of the turn, avoiding overshoot of the desired heading.

Compass 36, like bridge 121, is driven by the mechanism 120 and its associated balanced digital integrating system. In the instrumentation system of the invention, compass 36 replaces the usual gyro compass. Like a conventional gyro compass, compass 36 must be calibrated, and the calibration must be checked on occasion. But the integrating drive, based on sensing turning movements of the aircraft, that is used for compass 36, has a drift rate that is less than that of conventional gyro compasses by a factor of about ten. Hence, setting or calibration of the compass is required much less frequently than with a gyro compass.

Compass 36, and its associated control apparatus, is much less expensive than the gyro compass it effectively replaces. Furthermore, the integrating drive for compass 36 affords a much higher torque output than is available with a gyro compass, making it possible to drive the position plotter and the radial turning grid controls directly from the compass drive.

POSITION DISPLAY

Figure 11:
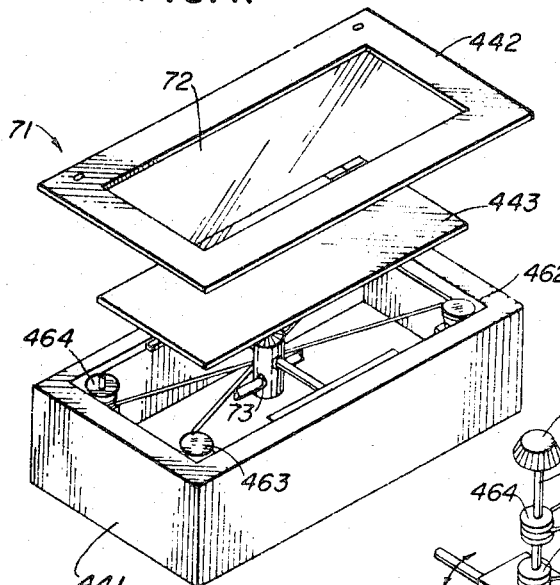
FIG. 11 is a simplified exploded perspective view of a position plotting display device.
Figure 12:
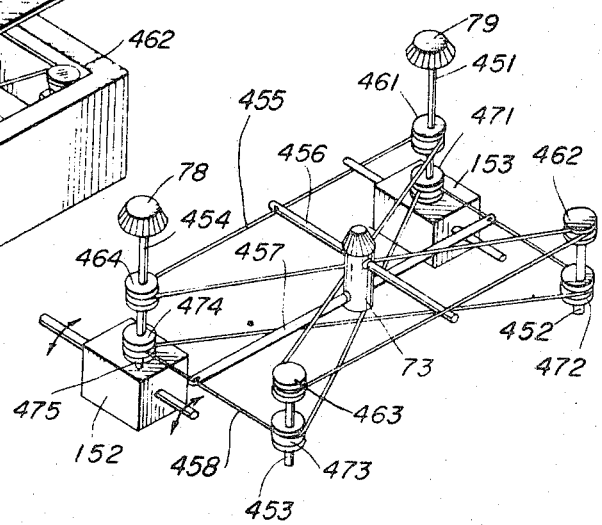
FIG. 12 is a partially schematic perspective view of a drive mechanism for the display device of FIG. 15.

The position display for the system, navigation plotter 71, may take the form illustrated in FIGS. 11 and 12.

FIG. 11 presents an exploded perspective view of the display, whereas FIG. 12 affords a detail view of the operating mechanism employed to position the position indicator or bug 73 within the display.

As shown in FIG. 11, the position display device 71 may include a generally rectangular housing 441 encompassing the display mechanism. Housing 441 is provided with a hinged or removable lid 442 of rectangular configuration having a transparent central window 72. A transparent map 443 is removably mounted over the top of housing 441 beneath frame 442, so that the map is exposed through the window 72.

A part of the operating mechanism for moving indicator 73 is shown in FIG. 11, but FIG. 12 affords a more complete and detailed view of this mechanism. As shown therein, there are four vertically oriented shafts 451, 452, 453 and 454 located at the four corners of the navigation plotter. A first flexible drive cord or string 455 extends around four pulleys 461, 462, 463 and 464 mounted in a common plane on shafts 451, 452, 453 and 454 respectively. Starting at shaft 451, it is seen that the drive cord 455 extends parallel to one side of the display to pulley 464, around pulley 464 and diagonally of the display to pulley 462. From pulley 462, cord 455 extends parallel to the other side of the display and around pulley 463 and thence diagonally across the display to pulley 461 again.

A first slide rod 456 is incorporated in the display mechanism. Slide rod 456 is affixed, at its opposite ends, to the two sections of cord 455 that extend parallel to the sides of the display housing. Movement of slide rod 456 parallel to the sides of the housing is employed to indicate north-south movement of the aircraft. To this end, bug 73 is provided with an aperture, slide rod 456 projecting through the aperture in the indicator bug.

Indicator bug 73 is also provided with a second aperture oriented at an angle of 90° with respect to the aperture that receives slid rod 456. A second slide rod 457 extends through this second aperture in the indicator bug, the opposite ends of slide rod 457 being secured to a second drive cord 458. Drive cord 458 extends around four additional pulleys 471, 472, 473 and 474 that are mounted upon shafts 461, 462, 463 and 464 respectively.

In the drive arrangement for slide rod 456, the first three pulleys 461, 462 and 463 are rotatable upon their respective shafts. Pulley 464 is affixed to shaft 454 for rotation therewith. Adjustment knob 78 may be affixed to or otherwise mechanically connected to shaft 454 to provide for manual adjustment of the north-south position of indicator bug 73. Shaft 454 is also mechanically connected to or connectable to the output shaft 475 of differential device 152. In FIG. 12 shafts 454 and 474 are shown as a common element, but it is usually desirable to afford a simple clutch connection for the shafts so that manual adjustment knob 78 can be actuated without driving differential device 152.

Similarly, only one of the pulleys for the second drive cord 458, pulley 471, is affixed to its shaft. The remaining pulleys are freely rotatable on their respective shafts. An east-west adjustment knob 79 is mechanically connected to the drive pulley 471 for the second cord 458, which controls the positioning of slide rod 457, and the east-west differential device 153 is also connected to the same pulley.

North-south movement of indicator knob 73 is accomplished by rotation of its drive pulley 464. Thus, if the drive pulley is rotated in a clockwise direction, slide rod 456 and indicator bug 73 are both driven toward the "north" end of the map. Similarly, if drive pulley 464 is rotated in a clockwise direction, then slide rod 456 and indicator bug 73 move toward the "south" of the map. Rotation of the drive pulley may be accomplished by differential device 152 or by actuation of an adjusting knob 78. In the same manner, the drive pulley for slide rod 457 may be actuated to move indicator bug 73 to the "east" or to the "west" with respect to the map 443 overlying the indicator bug (see FIG. 11).

POSITION CONTROL SYSTEM

Figure 13:
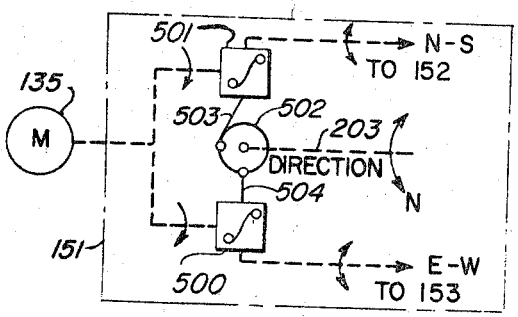
FIG. 13 is a schematic diagram of a computer apparatus used to actuate the position display device.
Figure 14:
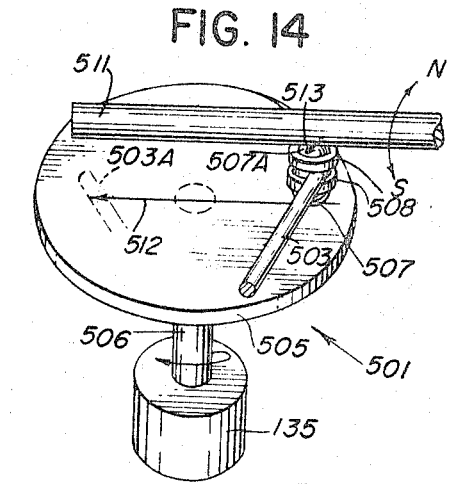
FIG. 14 is a simplified perspective view of a ball-disc integrator device used in the computer apparatus of FIG. 17.

FIGS. 13 and 14, when considered in conjunction with FIG. 2, illustrate the principal components of the control system utilized to drive the two differential devices 152 and 153 which, in turn, drive the navigation plotter 71 (FIG. 1). As noted above, the digital drive system shown in FIG. 2 is equally applicable to the transducer, oscillator, and amplifier that drive motor 158 in accordance with the wind speed setting adjusted by device 74. Similarly, transducer 127, oscillator 138 and amplifier 134 drive the motor 135 to afford actual air speed information in a usable form.

FIG. 13 is a partially schematic block diagram of heading computer 151. As shown therein, motor 135, which rotates at a speed proportional to the actual air speed of the aircraft, is employed to drive a pair of ball disc integrator devices 501 and 500. The second input to the computer is controlled by the position of the output shaft 203 of differential 120 (see FIG. 1), which position varies as the time integral of changes in the heading of the aircraft. Rotational displacement of shaft 203 is employed to position a control disc 502 that is mechanically connected, by two positioning rods 503 and 504, to the two ball disc integrators 501 and 500, respectively. It should be noted that the positioning rods 503 and 504 are connected to disc 502 at points displaced by exactly 90° with respect to each other so that the positions of the elements controlled by rods 503 and 504 are 90° displaced in phase with respect to each other.

FIG. 14 is a substantially simplified illustration of a ball disc integrator that may be utilized as the device 501. As shown therein, the integrator device 501 comprises a flat disc 505; disc 505 is shown directly mounted upon the output shaft 506 of motor 135. It will be understood that a suitable gear arrangement may be employed to drive the disc, since it is necessary to drive both of the integrators 501 and 502 from the motor. A ball bearing assembly comprising a pair of engaged balls 507 and 507A mounted within a suitable race member 508 is supported upon the top surface of disc 505. Race 508 is shown directly connected to the positioning rod 503; a suitable sliding yoke or other mechanical connection may be employed to obtain linear movement of race 508 in response to angular movement of rod 503. Inasmuch as there are a wide variety of known mechanical connections that are quite effective to afford the necessary translation of pivotal movement of the positioning rod to linear movement of the ball race, the yoke or other connecting mechanism has not been illustrated.

The output element of ball disc integrator 501, as shown in FIG. 14, comprises a shaft 511. Shaft 511 is disposed in frictional engagement with ball 507A of the bearing assembly. The shaft is aligned diametrically with disc 505, extending parallel to the diameter identified in the drawing by the arrows 512.

In the operation of ball disc integrator 501 (FIG. 14) disc 505 is rotated by motor 135. Since the output speed of motor 135 is determined by the air speed of the aircraft, it is seen that the rotational speed of disc 505 is proportional to the air speed. With the ball bearing assembly in the position shown in FIG. 14, near the right-hand end of diametrical line 512, the ball is rotated at maximum speed with respect to the rotational speed of the motor. Assuming that motor 135 drives shaft 506 in a clockwise direction as illustrated, ball 507A rotates in the direction indicated by arrow 513. As a consequence, shaft 511 is rotated in a clockwise direction, arrow N. It may be assumed that this is representative of movement of the aircraft toward the north. If the aircraft speeds up, the change in velocity is reflected in an increase in rotational speed in the output shaft 506 of motor 135. The resulting increase in rotational velocity of disc 505 rotates balls 507 and 507A faster and drives shaft 511 faster. The direction of rotation of shaft 511 continues to indicate that the aircraft is moving due north, still assuming that ball 507 is at the extreme right-hand end of its movement along diametrical line 512.

If the aircraft is now turned through an angle of 90° in either direction, position control disc 502 (FIG. 13) is rotated through an angle of 90°. When this occurs, the resulting pivotal movement of position rod 503 brings ball race 508 to the center of disc 505. Regardless of the rotational speed of disc 505, ball 507 is stationary when located at the exact center of the disc. Accordingly, shaft 511 is no longer rotated; thus the desired condition with the aircraft moving due east or due west, since shaft 511 is used for north-south movement of the aircraft.

If disc 502 is now rotated through an additional angle of 90°, position rod 503 reaches the alternate extreme position generally indicated by dash outline 503A. This places the ball bearing assembly at the extreme left-hand end of its travel along the diametrical line 512. Ball 507 is again rotated by its engagement with disc 505 but now rotates in the opposite direction; hence ball 507A rotates in a direction opposite arrow 513. Consequently, the output shaft 511 is now rotated, through its engagement with the ball, in a counterclockwise direction, arrow S, indicating that the aircraft is heading south. Of course, at points intermediate the two extreme positions 503 and 503A, the shaft 511 is rotated in a direction that indicates the direction of movement of the aircraft but at a speed proportional to the distance of the ball bearing assembly from the center of disc 505.

Ball disc integrator 500 is a substantial duplicate of device 501 except that it is operated 90° out of phase with respect to the north-south integrator. With positioning disc 502 in the position shown in FIG. 13, the input of motor 135 is translated by computer 151 as due north movement. Rotation of disc 502 through any angle less than 90° causes both the integrator output shafts to be rotated. Thus, the two ball disc integrators and the positioning device 502 are effective to resolve the air speed indication comprising the output of motor 135 into orthogonal components representative, respectively, of the east-west and the north-south movements of the aircraft. Ball disc integrators such as devices 501 and 500 are commercially available and are quite accurate in their operation; accordingly, the simplified illustration of FIG. 14 is all that is necessary to afford a complete understanding of the computer mechanism.

Wind computer 154 is essentially identical to computer 151. With reference to FIG. 1, it may be seen that the computed wind speed is supplied to computer 154 by the rotation of motor 158. The position or direction of the wind is established by adjustment of the positioning disc of this computer apparatus, using wind direction setting device 75. The two outputs shafts of wind computer 154 are connected to differential devices 152 and 153, as are the two output shafts of computer 151, the two differential devices completing the resolution of the air speed and wind speed information necessary for driving navigation plotter 71.

SPECIFIC CIRCUIT DATA

In order to afford a more complete disclosure of the invention, by way of specific examples, specific circuit parameters are set forth hereinafter with respect to the circuits illustrated in FIGS. 2 and 9. It should be understood that these data are presented only as exemplary information and in no sense as a limitation on the invention.

Resistors:
  227 _____ kilohms__ 33
  225, 238, 239, 246, 249, 421, 422 ____ do____ 10
  232 _____ do____ 2.2
  234, 236 _____ ohms__ 220
  242, 411, 412, 413, 414 _____ kilohms__ 220
  251, 252 _____ ohms__ 100
  426, 426 _____ kilohm__ 1

Capacitors:
  226, 233 _____ microfarads__ 10.0
  229 _____ do____ 0.5
  241 _____ do____ 0.01
  244, 248 _____ do____ 1.0
  405, 406 _____ do____ 2.0

Inductances:
  228 _____ henries__ 2

Power Supply
  C— _____ volts D.C.__ −12

CONCLUSION

From the foregoing description it will be apparent that the display system, as illustrated particularly in FIG. 1, presents to the pilot of an aircraft an instantly understandable display of the flight performance of the aircraft. The essential information with respect to aircraft attitude, speed, and direction of movement is presented in a manner that is essentially analogous to the corresponding information derived by the pilot when flying on the basis of visual observation, but with the aircraft itself taken as a fixed reference. For a given flight, from point to point, the pilot flies entirely by the main attitude display 32. Momentary diversion of his attention is not dangerous, since the movements of the display elements, and particularly the speed grid 65 and the turning grid 66, are easily detectible through the peripheral vision of the pilot.

An important aspect of the control and display system of the present invention is the treatment of the basic roll, pitch, and turn rate information. The transformation of the initial mechanical data from the basic detecting devices, through accurate rotary transducers, into push-pull digital integrator circuits, affords a long-term accuracy for the system not previously available in known devices, much less in a system of essentially inexpensive and simple components such as that described above. The pilot is assured of accurate information without continually resetting and re-calibrating the control system, adding materially to the benefits of the system and permitting the pilot to fly by instrument with a minimum of training and a maximum of safety.

The simple and rugged mechanisms employed for the roll sensing devices 101 and the pitch sensing devices 125 are also of substantial importance in connection with the system of the present invention. Each of these devices is, in essence, a simple pendulum corrected for extraneous forces. The preferred forms of sensing apparatus described above make it possible to obtain the essential accuracy in the determination of aircraft attitude without requiring complex and expensive multi-gimbal gyro mechanisms. Furthermore, these devices afford sufficient output torque for direct drive of a display apparatus.

Hence, while preferred embodiments of the invention have been described and illustrated, it is to be understood that they are capable of variation and modification.

I claim:

1. An integrating control system for monitoring the roll attitude of an aircraft with long-term stability, comprising:
  first and second oscillators each having a frequency-determining circuit tuned to a given operating frequency;
  first and second mechanically-actuated variable-ratio transducers each coupled to the frequency determining circuit of a respective one of said oscillators;
  actuating means for actuating said transducers in effective push-pull relation in accordance with the roll attitude of an aircraft, said actuating means including a roll-sensing device comprising a pendulum pivoted about an axis parallel to the longitudinal axis of the aircraft and corrected for angular acceleration, operatively connected to said transducers in push-pull relation to modulate the operating frequencies of said oscillators in opposite senses in response to roll attitude changes;
  first and second synchronous motors, each coupled to a respective one of said oscillators and having a rotational speed directly proportional to the operating frequency of said oscillator; and
  monitoring means comprising a differential drive having two input shafts and an output shaft, each of said input shafts being connected to a respective one of said motors, to drive said output shaft at a speed representative of the speed differential between said motors and in a direction indicative of which of said motors exceeds the speed of the other.

2. An integrating control system for controlling a turn display in an aircraft, with long-term stability, comprising:
  first and second oscillators each having a frequency-determining circuit tuned to a given operating frequency;
  first and second mechanically-actuated variable-ratio transducers each coupled to the frequency-determining circuit of a respective one of said oscillators;
  actuating means for actuating said transducers in effective push-pull relation in accordance with variations in the turn rate of an aircraft, comprising a turn sensing device connected to said transducers in push-pull relation to modulate the operating frequencies of said oscillators in opposite senses in accordance with changes in turn rate of the aircraft;
  first and second synchronous motors, each coupled to a respective one of said oscillators and having a rotational speed directly proportional to the operating frequency of said oscillator; and
  monitoring means comprising a differential drive having two input shafts and an output shaft, each of said input shafts being connected to a respective one of said motors, to drive said output shaft at a speed representative of the speed differential between said motors and in a direction indicative of which of said motors exceeds the speed of the other;
  said monitoring means further comprising a direction indicator, connected to said output shaft, for indicating turning movements of the aircraft, the angular position of said output shaft being continuously representative of the aircraft heading.

3. An integrating control system for control of a turn and heading display in an aircraft, according to claim 2, and further comprising a heading indicator actuated in accordance with the angular position of said output shaft.

4. An integrating control system for control of a turn and heading display in an aircraft, according to claim 2, and further comprising:
  a settable heading recording device for recording a preselected flight heading;
  a differential device, coupled to said recording device and to said output shaft, for developing an output signal representative of variations between said preselected flight heading and the actual heading of the aircraft; and
  a turn command indicator connected to said differential device.

5. An attitude control system for an aircraft comprising:
  a roll control apparatus including a roll sensing device, a pair of transducers connected in push-pull relation to said roll sensing device, a pair of oscillators coupled to respective ones of said transducers and frequency-modulated in push-pull relation to each other by said transducers, a pair of synchronous motors coupled to respective ones of said oscillators, and a first differential drive connected to both motors and having an output shaft rotatable in response to a speed differential between the motors so that the angular displacement of said output shaft continuously represents the roll attitude of an aircraft;
  a turn control apparatus, essentially similar to said roll control apparatus but including a turn sensing device and having an output shaft the angular displacement of which continuously represents the actual heading of the aircraft by dead reckoning;
  a settable heading recording device for recording a preselected flight heading;
  an additional differential device, coupled to said recording device and to the output shaft of said turn control apparatus, for developing an output signal representative of differences between said preselected flight heading and the actual heading of the aircraft;
  coupling means for applying said output signal of said additional differential device to at least one of the oscillators of said roll control apparatus to vary the operating frequency thereof and modify the position of said roll control output shaft; and
  operating means connected to said output shaft of said roll control apparatus for actuation in response to changes in roll attitude of the aircraft and to differences between the actual heading and preselected heading.

6. An integrating control system for controlling a speed command display in an aircraft, with long-term stability, comprising:
first and second oscillators each having a frequency-determining circuit tuned to a given operating frequency;
first and second mechanically-actuated variable-ratio transducers each coupled to the frequency-determining circuit of a respective one of said oscillators;
actuating means for actuating said transducers, comprising settable means for actuating one of said transducers to a given condition to adjust the operating frequency of a first one of said oscillators to a frequency representative of a preselected flight speed, and further comprising an air speed sensing device for actuating the other transducer in accordance with the actual speed of the aircraft to thereby modulate the operating frequency of the other oscillator to a frequency representative of actual air speed;
first and second synchronous motors, each coupled to a respective one of said oscillators and having a rotational speed directly proportional to the operating frequency of said oscillator; and
monitoring means comprising a differential drive having two input shafts and an output shaft, each of said input shafts being connected to a respective one of said motors, to drive said output shaft at a speed representative of the speed differential between said motors and in a direction indicative of which of said motors exceeds the speed of the other;
said monitoring means further comprising a speed command display driven by said output shaft in opposite directions for overspeed and underspeed conditions.

References Cited

UNITED STATES PATENTS 2,371,626  3/1945  Kecskemeti _____ 73—503
3,217,221  11/1965  Heggen et al. _____ 318—171

DONALD O. WOODIEL, Primary Examiner

U.S. Cl. X.R.
73—182; 244—77